United States Patent
Chen et al.

(10) Patent No.: US 11,207,822 B2
(45) Date of Patent: Dec. 28, 2021

(54) METHOD AND SYSTEM FOR FABRICATING MIXED-MATERIAL 3D OBJECT

(71) Applicant: Zhuhai Seine Technology Co., Ltd., Zhuhai (CN)

(72) Inventors: Wei Chen, Zhuhai (CN); Xiaokun Chen, Zhuhai (CN); Darong Ma, Zhuhai (CN); Wei Jiang, Zhuhai (CN)

(73) Assignee: ZHUHAI SAILNER 3D TECHNOLOGY CO., LTD., Zhuhai (CN)

(*) Notice: Subject to any disclaimer, the term of this patent is extended or adjusted under 35 U.S.C. 154(b) by 233 days.

(21) Appl. No.: 16/114,585

(22) Filed: Aug. 28, 2018

(65) Prior Publication Data
US 2018/0361655 A1    Dec. 20, 2018

Related U.S. Application Data

(63) Continuation of application No. PCT/CN2016/093887, filed on Aug. 8, 2016.

(30) Foreign Application Priority Data

May 4, 2016    (CN) .......................... 201610294499.0

(51) Int. Cl.
  *B29C 64/112*    (2017.01)
  *B33Y 10/00*    (2015.01)
  (Continued)

(52) U.S. Cl.
  CPC .......... *B29C 64/112* (2017.08); *B29C 64/393* (2017.08); *B29C 67/0007* (2013.01);
  (Continued)

(58) Field of Classification Search
  CPC .............................. B29C 64/12; B29C 64/393
  See application file for complete search history.

(56) References Cited

U.S. PATENT DOCUMENTS

| 2006/0035034 A1* | 2/2006 | Matsumoto ............ B33Y 70/00 427/487 |
| 2010/0191360 A1* | 7/2010 | Napadensky ......... B29C 67/202 700/98 |

(Continued)

FOREIGN PATENT DOCUMENTS

| CN | 103434135 A | 12/2013 |
| CN | 104093547 A | 10/2014 |

(Continued)

OTHER PUBLICATIONS

The World Intellectual Property Organization (WIPO) International Search Report for PCT/CN2016/093887 dated Dec. 26, 2016 6 Pages.

*Primary Examiner* — Joseph A Miller, Jr.
(74) *Attorney, Agent, or Firm* — Anova Law Group, PLLC

(57) ABSTRACT

The present disclosure provides a method for fabricating a mixed-material 3D object, including forming, based on layer-print data of a target object, a layer-print product by one-by-one printing a plurality of pixels, using $N_0$ types of main materials for the target object; forming a plurality of the layer-print products by repeatedly forming the layer-print product; and forming a mixed-material 3D object by stacking one of the layer-print products on another. Each of the plurality of pixels is printed by $N_1$ types of the main materials and $N_2$ types of auxiliary materials, $N_1 \leq N_0$, and when $N_1 < N_0$, $N_2 \geq 1$, and each of the plurality of pixels is formed by ejecting a plurality of ink droplets.

11 Claims, 9 Drawing Sheets

(51) Int. Cl.
  *B33Y 30/00* (2015.01)
  *B33Y 50/02* (2015.01)
  *B29C 64/393* (2017.01)
  *B29C 67/00* (2017.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2010/0195122 A1 | 8/2010 | Kritchman |
| 2015/0093552 A1* | 4/2015 | Biskop .................. B29C 64/209 428/201 |
| 2015/0094394 A1 | 4/2015 | Jung et al. |
| 2016/0001505 A1 | 1/2016 | Hakkaku et al. |

FOREIGN PATENT DOCUMENTS

| | | | |
|---|---|---|---|
| CN | 104275799 A | | 1/2015 |
| CN | 104290322 A | | 1/2015 |
| CN | 104647754 A | | 5/2015 |
| WO | WO2015026847 | * | 2/2015 |
| WO | WO2015/108543 | * | 7/2015 |
| WO | 2015138567 A1 | | 9/2015 |

* cited by examiner

METHOD AND SYSTEM FOR FABRICATING MIXED-MATERIAL 3D OBJECT

CROSS-REFERENCE TO RELATED APPLICATIONS

This application is a continuation application of International Application No. PCT/CN2016/093887, filed on Aug. 8, 2016, which claims priority to Chinese Patent Application NO. 201610294499.0, filed on May 4, 2016. The above enumerated patent applications are incorporated herein by reference in their entity.

TECHNICAL FIELD

The present disclosure relates to the field of rapid molding of three dimensional (3D) objects and a technique for fabricating a 3D object by successively stacking material layer by layer using inkjet print heads and, in particular, to a method and a system for fabricating a mixed-material 3D object.

BACKGROUND

In rapid molding technology, also known as rapid prototyping or additive manufacturing technology, materials are successively stacked layer by layer based on a layered three-dimensional (3D) model to fabricate a 3D object.

At present, 3D objects are fabricated using rapid molding technologies, including a fused deposition modeling (FDM) technology, a stereolithography (SLA) technology, a selective laser sintering (SLS) technology, a laminated object manufacturing (LOM) technology, a three-dimensional inkjet printing (3DP) technology, etc. Among them, using the 3DP technology to fabricate 3D objects is one of the hottest topics in recent years, especially in how to use the 3DP technology to fabricate full colored 3D objects.

Conventional methods for fabricating the colored 3D objects include use of magenta (M), yellow (Y), cyan (C), and black (BK), as molding materials for fabricating a 3D object. The four color inks are respectively accommodated in different inkjet print heads, and according to the data of a 3D model, the inkjet print heads are controlled by a drive controller to perform the layer-by-layer inkjet printing. Because the photocurable resin materials are used, each droplet of ink ejected by the print heads can have a certain volume after cured by light. A large number of cured ink droplets stacked one on another to form a 3D object. The principle of inkjet print heads for inkjet printing is that each pixel corresponds to one ink droplet. For example, when printing a red region, each pixel corresponds to a magenta ink droplet. To print a green region, each pixel can be formed by a yellow ink droplet and a cyan ink droplet. One pixel in the green region corresponds to two ink droplets and one pixel in the red region corresponds to one ink droplet, resulting in uneven surface of the 3D object and eventually affecting dimensional accuracy of the 3D object. Therefore, colored objects can be printed only with a limited number of colors, and full colored object cannot be printed. In addition, the color inks of different colors have to be as consistent as possible in material properties, such as shrinkage rate. Different shrinkage rates of the materials may cause uneven surfaces for adjacent areas during the photocuring process.

Therefore, how to achieve printing a full colored 3D object using the 3D inkjet printing technology, and how to print the 3D object with different materials and high molding accuracy are problems need to be solved.

SUMMARY

To solve the above problem, one aspect of the present disclosure provides a method for fabricating a mixed-material 3D object. The method includes: forming, based on layer-print data of a target object, a layer-print product by one-by-one printing a plurality of pixels, using $N_0$ types of main materials for the target object. Each of the plurality of pixels is printed by $N_1$ types of the main materials and $N_2$ types of auxiliary materials, $N_1 \leq N_0$, and when $N_1 < N_0$, $N_2 \geq 1$, and each of the plurality of pixels is formed by ejecting a plurality of ink droplets. The method further includes forming a plurality of the layer-print products by repeatedly forming the layer-print product; and forming a mixed-material 3D object by stacking one of the layer-print products on another.

Optionally, each ink droplet is ejected using one of: one type of the main materials and one type of the auxiliary materials. At most one ink droplet of a same type of the main materials is ejected for each pixel.

Optionally, a same number of ink droplets are ejected for every pixel.

Optionally, for each pixel, at least one ink droplet of the main materials is ejected and/or at least one ink droplet of the auxiliary materials is ejected.

Optionally, at least one ink droplet of the main materials is ejected for each pixel. Multiple ink droplets of a same type of the main materials are ejected for each pixel.

Optionally, at least one ink droplet of the auxiliary materials is ejected for each pixel. Multiple ink droplets of a same type of the auxiliary materials are ejected for each pixel.

Optionally, before forming the layer-print product, the target object is layered, and the layer-print data based on structural information and nonstructural information of each layer of the target object is obtained. The layer-print data includes layer structural data and layer nonstructural data.

Optionally, the nonstructural data includes color data and/or material-property data.

Optionally, forming the plurality of the layer-print products includes: forming, according to the layer structural data, a layer-support product by one-by-one printing supporting pixels using supporting materials. The layer-support product is configured to provide a support for adjacent layer-print products.

Optionally, the supporting materials include main supporting materials and the auxiliary materials. Each supporting pixel is formed by ejecting a plurality of supporting ink droplets. Each of the plurality of supporting ink droplets is ejected using one of: one type of the main supporting material and one type of the auxiliary material.

Optionally, each supporting pixel is printed using at least one type of the main supporting materials and at least one type of the auxiliary materials.

Optionally, a number of the ink droplets for each pixel is same as a number of supporting ink droplets for each supporting pixel.

Optionally, the auxiliary materials include one or more of a white material, a transparent material, and a light-color material.

Optionally, the plurality of ink droplets for a single pixel are distributed on a same x-y plane.

Another aspect of the present disclosure provides a system for fabricating the mixed-material 3D object. The system including a processing terminal, a print head and a drive controller. The processing terminal is configured to layer a target object and obtain layer-print data of the target object according to structural information and nonstructural information of each layer of the target object. The print head is configured to eject printing materials and including at least two printing channels of main materials and at least one printing channel of auxiliary material, and ejection orifices. The printing materials include main materials, auxiliary materials and main supporting materials. The drive controller controls the print head to form, based on layer-print data of a target object, a layer-print product by one-by-one printing a plurality of pixels, using $N_0$ types of main materials for the target object; form a plurality of the layer-print products by repeatedly forming the layer-print product; and form a mixed-material 3D object by stacking one of the layer-print products on another. Each of the plurality of pixels is printed by $N_1$ types of the main materials and $N_2$ types of auxiliary materials, $N_1 \leq N_0$, and when $N_1 < N_0$, $N_2 \geq 1$. Each of the plurality of pixels is formed by ejecting a plurality of ink droplets.

Optionally, the print head further includes at least one printing channel for the main supporting materials.

Optionally, LEDs are respectively disposed on sides of the print head along a printing direction.

Optionally, the system includes a lifting platform configured to hold and move the mixed-material 3D object.

The method and system provided by the system of the present disclosure have the following advantages.

For each pixel, types of printing materials for the plurality of ink droplets can be controlled; and a number of the plurality of ink droplets for each pixel can also be controlled, such that a full-color printing and mixed-material printing can be achieved.

Different types of printing materials with matching properties are selected, such that general solidification speeds and shrinkage rates of the printing materials for adjacent pixels can be approximately the same, which can effectively improve the molding accuracy of the 3D object, and reduce difficulty of using combined materials.

At most one of the ink droplets of a same type of printing materials is ejected for each pixel, improving a usage efficiency of printing channels and thereby improving the molding efficiency of the 3D object.

For each single pixel, the plurality of ink droplets is uniformly distributed on a same x-y plane, preventing ink droplets for each single pixel from mixing with each other and thereby improving a color accuracy and a material-property accuracy for a printed object.

DESCRIPTION OF THE DRAWINGS

To clearly illustrate features, objects and advantages of the present disclosure, the drawings used in the description of the embodiments are briefly described below.

DETAILED DESCRIPTION

Figure 1:
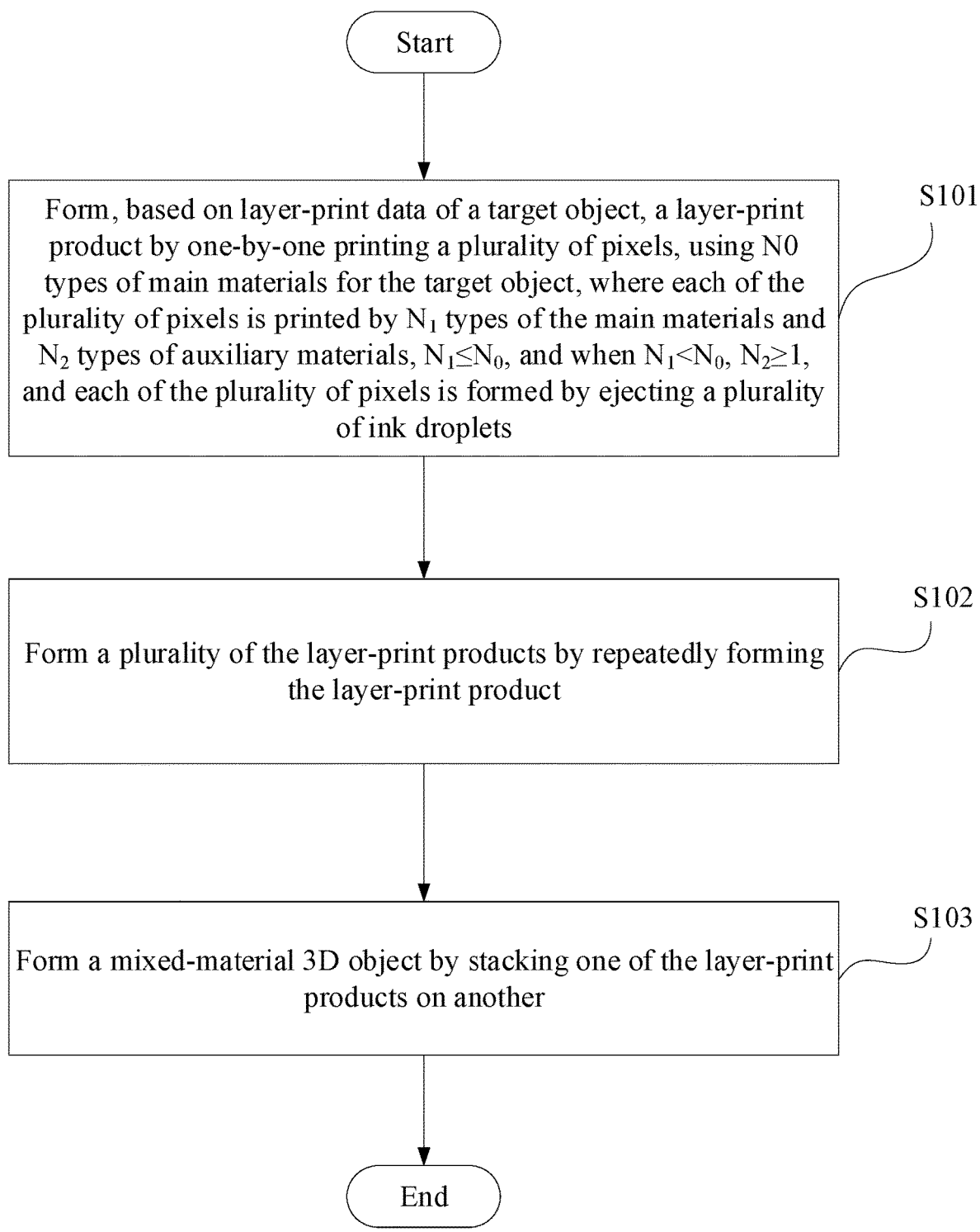
FIG. 1 shows a flow chart of an exemplary method for fabricating a mixed-material 3D object according to some embodiments of the present disclosure.

FIG. 1 shows an exemplary method for fabricating a mixed-material 3D object according to some embodiments of the present disclosure. The colored 3D object is fabricated by layer-by-layer printing. The method may include following exemplary steps. First, S101 may be performed.

In S101: Based on layer-print data of a target object, a layer-print product is formed by printing a plurality of pixels one by one. $N_0$ types of main materials may be used to print the target object, $N_1$ types of main materials may be used to print each of the plurality of pixels, and $N_2$ types of auxiliary materials may be used to print each of the plurality of pixels, where $N_1 \leq N_0$, and when $N_1 < N_0$, $N_2 \geq 1$.

The layer-print data may include layer structural data, and layer nonstructural data. Both layer structural data and the layer nonstructural data may be data with spatial coordinates. The layer nonstructural data may also be related to a category of the main materials. In one example, the main materials may be materials with different colors, the layer nonstructural data may be data of color values. In another example, the main materials may be materials with different properties, the layer nonstructural data may be material-property data. Further, the layer-print data may be related to the plurality of pixels. For example, the layer structural data may include data of N structural pixels, while the layer nonstructural data may include data of M color values. According to the data of N structural pixels and the data of M color values, a drive controller may control a print head to eject printing materials, so as to print the layer-print product.

Further, according to embodiments of the present disclosure, the printing materials used to print the plurality of pixels include main materials and auxiliary materials. The main materials are characteristic materials, which indicate colors and properties of the 3D object. The auxiliary materials are used to cooperate with the main materials and may not be distinguished from the main materials in terms of the appearance. A category of the auxiliary materials may be determined according to the category of main materials used in an actual application. For example, the main materials may be colored materials, such as colored photosensitive resin materials or colored thermal solidifiable materials. To achieve a full-color printing, the main materials may include a combination of a magenta (M) material, a yellow (Y) material, and a cyan (C) material, or a combination of the M material, the Y material, the C material and a black (BK) material or other combinations of colored materials. The auxiliary materials may be photosensitive resin materials or thermal solidifiable materials and the auxiliary materials may be one of a white (W) material, a transparent (T) material, or a light-color material, etc.

Further, a plurality of ink droplets may be ejected to print each pixel and each ink droplet may include one type of the main materials or one type of the auxiliary materials. In one embodiment, the main materials are combinations of the M material, the Y material, and the C material, and the auxiliary material is the W material, and thus $N_0=3$. If the M material and the Y material are used to print one pixel, $N_1=2$. Specially, if three ink droplets are ejected to print each pixel, different printing manners can be applied according to difference of each pixel from another. In one example, one ink droplet of the M material, one ink droplet of the Y material, and one ink droplet of the W material are ejected for one pixel, where $N_1=2$, and $N_2=1$. In another example, one ink droplet of the M material and two ink droplets of the W material are ejected for one pixel, where $N_1=1$, and $N_2=1$. In further another example, one ink droplet of the Y material, and two ink droplets of the W material are ejected, where $N_1=1$, and $N_2=1$.

Figure 2:
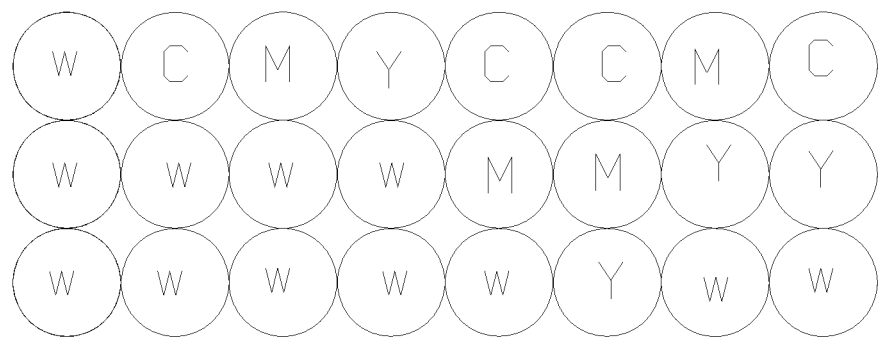
FIG. 2 schematically shows an exemplary arrangement for ink droplets of adjacent pixels on an x-y plane using a printing manner of ejecting three ink droplets for each pixel according to some embodiments of the present disclosure.

FIG. 2 schematically shows an exemplary arrangement for ink droplets of adjacent pixels on an x-y plane using a printing manner of ejecting three ink droplets for each pixel according to some embodiments of the present disclosure. As shown in FIG. 2, each column represents a pixel, and each circle with a letter represents an ink droplet. Three ink droplets for one pixel are sequentially arranged on the same x-y plane. For example, a pixel represented by the first column is formed by ejecting three ink droplets of the W material; a pixel represented by the second column is formed by ejecting one ink droplet of the C material and two ink droplets of the W material, and so on. FIG. 2 only shows one exemplary arrangement of the plurality of the pixels. To print the mixed-material 3D object, other arrangement manners of the pixels can be determined based on the layer structural data and layer nonstructural data, and are not elaborated herein. In a process of printing the layer-print product, for a specific region, more colors can be obtained by adjusting ratios of the M material, the Y material, the C material, and the W material. Optionally, in one embodiment, when the main materials are combinations of the M material, the Y material, and the C material, and the auxiliary materials are the W material and the T material, $N_0=3$. When three ink droplets are ejected to print each pixel, among which two ink droplets are auxiliary materials, if one ink droplet of the auxiliary materials is a ink droplet of the W material, and the other ink droplet of the auxiliary materials is a ink droplet of the T material, $N_1=1$ and $N_2=2$.

Figure 3:
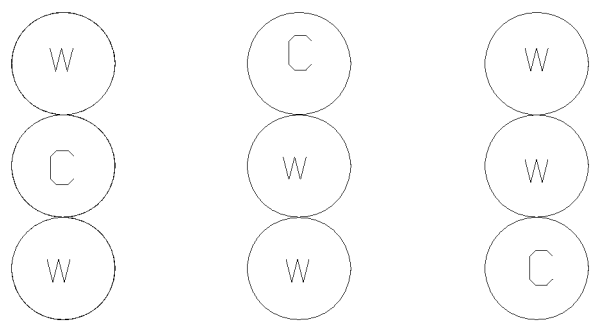
FIG. 3 schematically shows an exemplary arrangement for ink droplets for a cyan pixel on an x-y plane according to some embodiments of the present disclosure.

Further, taking the pixel of the second column in FIG. 2 as an example, a final color of the pixel is cyan. For this pixel, any arrangement manner of the C material and the W material does not affect the formation of the pixel. For example, FIG. 3 shows three exemplary arrangement manners of three ink droplets for each pixel on the x-y plane, and all three arrangement manners can be used to form the cyan pixel. In some embodiments, if an area needs to exhibit a color lighter than the color of the C material, it can be achieved by increasing the ratio of the white pixels per unit area of the area, alternating the white pixels and the cyan pixels. That is because that a combination of colors of multiple pixels rather than a color of one pixel can represent a color of an object.

Figure 4:
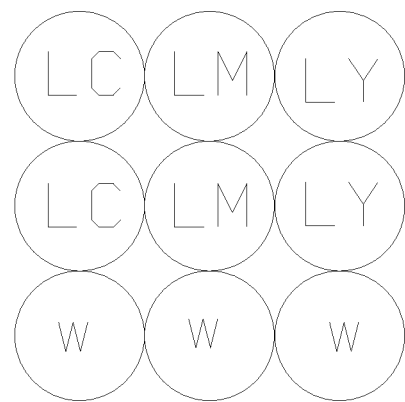
FIG. 4 schematically shows an exemplary arrangement for ink droplets of adjacent pixels using a light-color main material on an x-y plane according to some embodiments of the present disclosure.

In some other embodiments, if the main materials are a light-magenta (LM) material, a light-yellow (LY) material, and a light-cyan (LC) material. To have one pixel exhibit a darker color, it can be achieved by increasing the number of ink droplets of a same type of the main materials for the pixel. As shown in FIG. 4, for example, when two ink droplets of the LM material and one ink droplets of the W material are ejected onto the x-y plane, $N_1=1$, and $N_2=1$. When two ink droplets of the LY material and one ink droplet of the W material are ejected onto the x-y plane, $N_1=1$, and $N_2=1$. When two ink droplets of the LC material and one ink droplet of the W material are ejected onto the x-y plane, $N_1=1$, and $N_2=1$. Thus, to have one pixel exhibit a darker color, number of ink droplets of the same type of the main materials for the pixel may be larger than one. To improve printing efficiency, a plurality of printing channels may be configured to eject a same colored main material. Such that, through each corresponding printing channel, one of the LM material, the LY material and the LC material can be ejected by corresponding ejection orifices of the corresponding printing channel.

Optionally, at most one ink droplet of a single colored main material may be ejected for each pixel. For example, if three ink droplets are ejected to print each pixel, at most one ink droplet of any one of the M material, the Y material, and the C material may be ejected. When one ink droplet of the M material, one ink droplet of the Y material, and one ink droplet of the C material are ejected, $N_1=3$, and $N_2=0$. When one ink droplet of the Y material, one ink droplet of the C material, and one ink droplet of the W material are ejected, $N_1=2$, $N_2=1$. When one ink droplet of the Y material and the two ink droplets of the W material are ejected, $N_1=1$, $N_2=1$. In this way, the utilization of the printing channel can be improved, thereby increasing a molding speed for the 3D object. In some embodiments, a plurality of ink droplets for each pixel may be arranged on a same x-y plane. Different ink droplets are ejected by ejection orifices of different printing channels and thus there may be difference in time when different ink droplets are ejected. In addition, ejected ink droplets are solidified or semi-solidified on a receiving surface. Thus, at least most of the plurality of ink droplets for a same pixel are not mixed with each other on the receiving surface. Such that, the printed colored object can be accurately colored, or the printed mixed-material object can have accurate properties.

Figure 5:
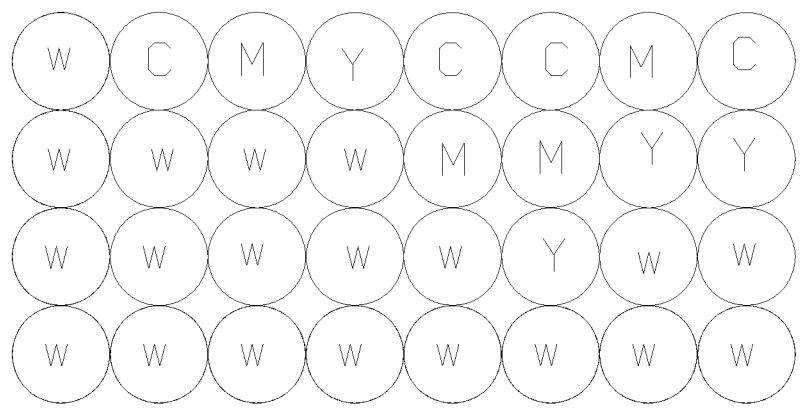
FIG. 5 schematically shows an exemplary arrangement for ink droplets of adjacent pixels on an x-y plane using a printing manner of ejecting four ink droplets for each pixel according to some embodiments of the present disclosure.

In some embodiments, four ink droplets are ejected to print each pixel, and different printing manners can be applied based on different pixels. In one example, one ink droplet of the M material, one ink droplet of the Y material, and two ink droplets of the W material are ejected to print a pixel, where $N_1=2$, and $N_2=1$. In another example, one ink droplet of the M material and three ink droplets of the W material are ejected for a pixel, where $N_1=1$, and $N_2=1$. In a different example, one ink droplet of the Y material and three ink droplets of the W material are ejected for a pixel, where $N_1=1$, and $N_2=1$. More various printing manners can be achieved by those skilled in the art according to embodiments of the present disclosure. Further, FIG. 5 schematically shows an exemplary arrangement for ink droplets of adjacent pixels using a printing manner of ejecting four ink droplets for each pixel on an x-y plane according to some embodiments of the present disclosure, according to which, those skilled in the art can more clearly understand the above exemplary printing manners. As shown in FIG. 5, each column represents a pixel, and each circle with a letter represents an ink droplet. Four ink droplets for one pixel are sequentially arranged on the same x-y plane. For example, a pixel represented by the first column is formed by ejecting four ink droplets of the W material; a pixel represented by the second column is formed by ejecting one ink droplet of the C material and three ink droplets of the W material, and so on. FIG. 5 only shows one exemplary arrangement of the plurality of the pixels. To print the mixed-material 3D object, other arrangement manners of the pixels can be determined based on the layer structural data and layer nonstructural data, and are not elaborated herein. Detailed description can refer to description of FIG. 2 and are not repeated here.

Optionally, at most one ink droplet of a single colored main material may be ejected for each pixel. For example, if four ink droplets are ejected to print each pixel, at most one ink droplet of any one of the M material, the Y material, and the C material may be ejected. When one ink droplet of the M material, one ink droplet of the Y material, one ink droplet of the C material and one ink droplet of the W material are ejected, $N_1=3$, and $N_2=1$. When one ink droplet of the Y material, one ink droplet of the C material, and two ink droplets of the W material are ejected, $N_1=2$, $N_2=1$. When one ink droplet of the Y material and the three ink droplets of the W material are ejected, $N_1=1$, $N_2=1$. In actual applications, each printing channel corresponds to a single colored main material, such that, the utilization of the printing channel can be improved, thereby increasing a molding speed for the 3D object. Specifically, through each corresponding printing channel, each of the M material, the Y material, and the C material may be ejected by ejection orifices in each corresponding printing channel; while the W material may be ejected by ejection orifices of a plurality of (three or four) printing channels. According to actual requirements, it can be determined whether the plurality of printing channels of the W material ejects the ink droplets at the same time. The present disclosure does not limit sequences for printing channels of different materials to eject.

Figure 6:
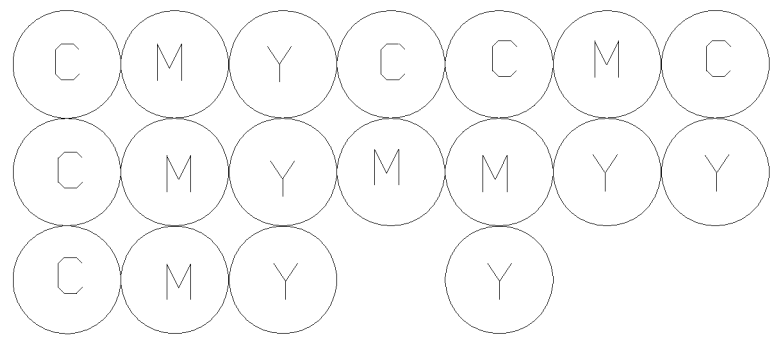
FIG. 6 schematically shows an exemplary arrangement for ink droplets of adjacent pixels on an x-y plane according to a conventional technology.

FIG. 6 schematically shows an exemplary arrangement for ink droplets of adjacent pixels on an x-y plane according to a conventional technology, which is different from embodiments of the present disclosure. As shown in FIG. 6, in the conventional technology, three ink droplets are ejected for each pixel and each column represent one pixel. According to the layer structural data, the color of each pixel can be determined, and each pixel is formed by ejecting ink droplets of different colors. For example, three ink droplets of the C material are ejected to form a cyan pixel in the first column; three ink droplets of the Y material are ejected to form a yellow pixel in the second column, and so on. According to the color theory, to form a blue pixel in the fourth column, one ink droplet of the C material, and one ink droplet of the M material are ejected. To form a red pixel in the sixth column, one ink droplet of the Y material and one ink droplet of the M material are ejected. To form a green pixel in the seventh column, one ink droplet of the C material, and one ink droplet of the Y material are ejected. However, in an actual printing process, to form each pixel, three ink droplets are ejected. Therefore, one ink droplet of other colored materials is ejected in the fourth column, the sixth column, and the seventh column. Such that, the pixels respectively represented by the fourth column, the sixth column, and the seventh column cannot match expected colors. That is, the expected colors can be achieved by ejecting only two ink droplets; however, one more ink droplet has to be ejected in the actual printing process, and the resulted colors by stacking is certainly different from the expected colors. The number of ink droplets ejected can be controlled to be, e.g., only two, for the fourth column, the sixth column, and the seventh column to achieve the expected colors. However, because the 3D object is basically formed by stacking one ink droplet on another, if each ink droplet has the same volume as another, a total volume of each pixel is not consistent with another when the pixels include different numbers of ink droplets, which results in a deformation of the 3D object, affecting the printing accuracy. Thus, the conventional technology, e.g. as shown in FIG. 6 cannot achieve printing a full colored 3D object with high accuracy.

Further, compared with the conventional technology, referring to FIG. 2 and FIG. 5, according to embodiments of the present disclosure, a similarity of different colored materials for adjacent pixels may be between 33.3% and 75%. A requirement of similar properties of materials can be lowered during a process of selecting C, M, and Y colored photosensitive resin materials, thereby expanding an applicating range of the main materials. In addition, during a photocuring process, under irradiation of a light source with a same intensity, general solidification speeds and shrinkage rates of the main materials and the auxiliary materials can be approximately the same, which can effectively improve the molding accuracy of the 3D object.

Further, S102 and S103 may be performed.

In S102: A plurality of layer-print products is formed by repeatedly performing S101.

In S103: A mixed-material 3D object is formed by stacking one layer-print product on another.

It should be noted that S103 is a molding step. The target object may be layered to a plurality of layers, and each layer can be printed through S101 and S102, and the mixed-material 3D object can be formed by stacking one layer on another. The stacking in S103 is not necessarily performed at the last step but accompany with the foregoing steps. That is, stacking one layer may include forming a layer through S101, and the stacking process is an accumulating process. The stacking process includes stacking not only along a extending direction of each layer, but also along the layered direction of the target object. The colored 3D object may be formed after all stacking processes are completed.

In some embodiments, the main materials may be materials with different properties, including physical or chemical properties such as elasticity, mechanical properties, curing properties, etc. Accordingly, the layer nonstructural data may be material-property data. For example, the layer structural data may include data of N' structural pixels, and the material-property data may include M' values of the material properties. Both the layer structural data and the material-property data may include spatial coordinates. According to the N' structural pixels and the M' values of the material properties, the drive controller can control the print head to eject printing materials to print, so as to form the layer-print products.

Figure 7:
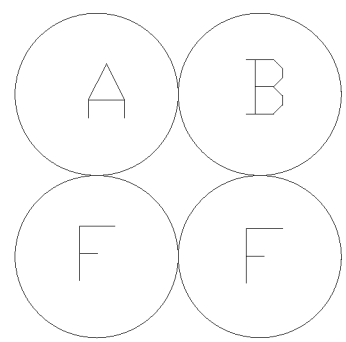
FIG. 7 schematically shows another exemplary arrangement for ink droplets of adjacent pixels on an x-y plane according to some embodiments of the present disclosure.
Figure 8:
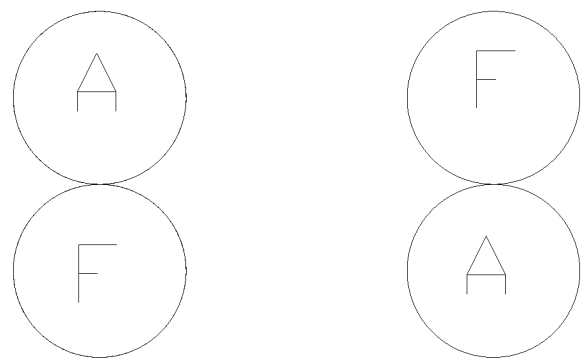
FIG. 8 schematically shows an exemplary arrangement for ink droplets to print pixels using a property material A on an x-y plane according to some embodiments of the present disclosure.

In one embodiment, two photosensitive resin materials, e.g. property material A and property material B, with different elasticities may be used as the main materials, and $N_0=2$. The auxiliary materials can be determined according to actual requirement, and the target 3D object can be printed by using the auxiliary materials with combination of the property material A and the property material B. For example, the auxiliary material may be a photosensitive auxiliary material F. In this embodiment, two ink droplets are ejected to form each pixel, and at most one ink droplet of the main materials can be ejected for each pixel. FIG. 7 schematically shows another exemplary arrangement for ink droplets of adjacent pixels on an x-y plane according to some embodiments of the present disclosure, where $N_0=2$, $N_1=1$, and $N_2=1$. The principle of the example shown in FIG. 7 is similar to FIG. 2 or FIG. 5, and therefore is not repeated herein. Similarly, arrangement manners of droplets for one pixel are not limited herein. FIG. 8 schematically shows an exemplary arrangement for ink droplets to print pixels using material A on an x-y plane according to some embodiments of the present disclosure. As shown in FIG. 8, although the arrangement manners of the property material A for different pixels are different, the property of each pixel exhibited a common property of the property material A and the auxiliary material F.

Figure 9:
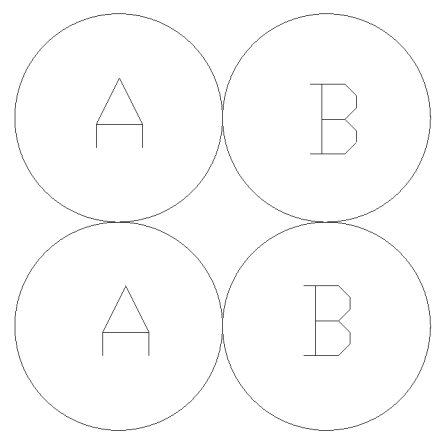
FIG. 9 schematically shows another exemplary arrangement for ink droplets of adjacent pixels on an x-y plane according to a conventional technology.

Further, FIG. 9 schematically shows another exemplary arrangement for ink droplets of adjacent pixels on an x-y plane according to a conventional technology, which is compared with embodiments of the present disclosure. Specially, in the conventional technology, two ink droplets are ejected to form each pixel, and the two ink droplets are materials having the same properties. It is clear to notice by comparing FIG. 7 and FIG. 9 that, a similarity of materials for adjacent pixels in FIG. 7 is 50%, while a similarity of materials for adjacent pixels in FIG. 9 is 0. A requirement of consistent properties of materials can be lowered during a process of selecting main materials during a process of printing the mixed-material 3D object according to embodiments of the present disclosure, thereby expanding an applicating range of the main materials. In addition, during a photocuring process, under irradiation of a light source with a same intensity, general solidification speeds and shrinkage rates of the main materials and the auxiliary materials can be approximately the same, which can effectively improve the molding accuracy of the 3D object.

Figure 10:
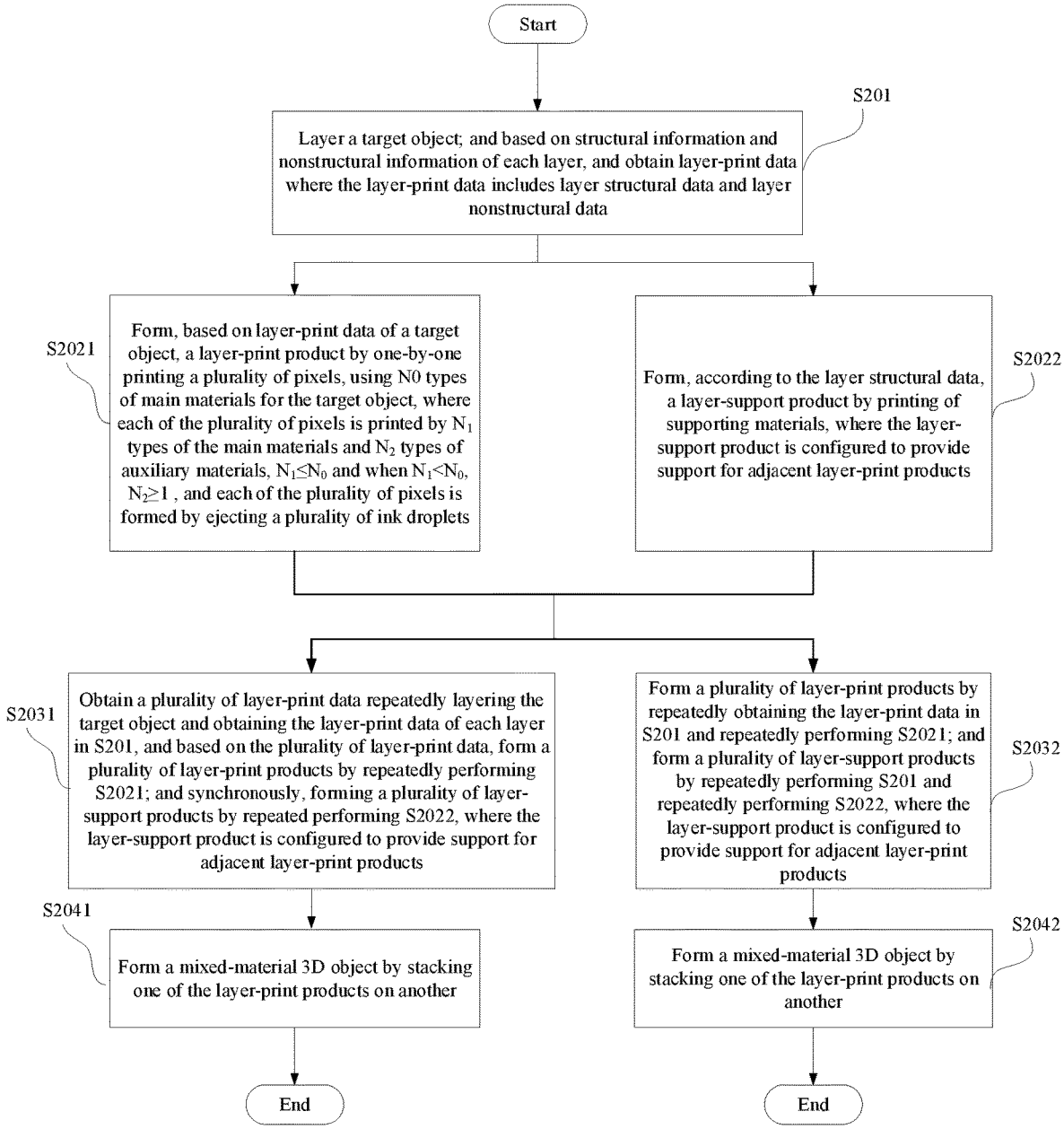
FIG. 10 shows a flow chart of another exemplary method for fabricating a mixed-material 3D object according to some embodiments of the present disclosure.

In some embodiments of the present disclosure, as shown in FIG. 10, the method may include the following. First S201 may be performed.

In S201: A target object is layered; and based on structural information and nonstructural information of each layer, layer-print data is obtained. The layer-print data includes layer structural data and layer nonstructural data.

S201 includes converting the target object into a form of data, and the structural information and the nonstructural information can be obtained by scanning the target object. The structural information and the nonstructural information can be further converted to a data file in a format that can be recognized by a slicing software of a processing terminal, e.g., STL format, PLY format, and WRL format, etc. Optionally, the structural information and the nonstructural information may be layer based, e.g., the target object after being scanned may be layered by the slicing software, the structural information and the nonstructural information of each layer may be obtained by analyzing each layer, and the structural information and the nonstructural information of each layer may be further converted to the layer structural data and the layer nonstructural data. The nonstructural information may include color information or material-property information, and correspondingly, the layer nonstructural data may include data of color value or material-property data.

Optionally, the target object can also be directly drawn by a drawing software. The drawing software may include, for example CAD, Pro E, SolidWorks, UG, and 3D Max, etc. The target object drawn by the drawing software is a basic structure model of the target object. A color match or property of material selection may be performed on the basic structure model. Take color match for example, and there are many commonly used methods for matching color. In one example, the basic structure model may be directly matched with colors and then converted into a PLY format. In another example, the basic structure model may be first converted to the a STL format and then matched with colors. Those skilled in the art can make various changes based on existing technologies, which is not elaborated herein.

Further, S2021 and S2022 may be performed.

In S2021: Based on layer-print data of a target object, a layer-print product is formed by printing a plurality of pixels one by one. $N_0$ types of main materials may be used to print the target object, $N_1$ types of main materials may be used to print each of the plurality of pixels, and $N_2$ types of auxiliary materials may be used to print each of the plurality of pixels. $N_1 \leq N_0$, and when $N_1 < N_0$, $N_2 \geq 1$. S2021 is the same as S101, and thus details are not repeated herein.

In S2022: According to the layer structural data, a layer-support product is formed by printing of a supporting material. The layer-support product is configured to provide support for adjacent layer-print products.

Further in S201, when layer structural data is obtained, a plurality of supporting pixels may be established based on the basic structure of adjacent layers, the spatial coordinate value may be set for each of the supporting pixels, and a plurality of spatial coordinate values corresponding to the plurality of supporting pixels may be determined as a part of the layer-structure data. The printing principle of S2022 is similar to the printing principle of S101. That is, the supporting material may include a main support material and an auxiliary material. A plurality of supporting ink droplets is ejected to form each supporting pixel, and one of the main supporting material and the auxiliary material is used for each supporting ink droplet. Further, at least one supporting ink droplet of the main supporting material is ejected for each supporting pixel; and supporting ink droplets of the auxiliary materials are ejected for rest parts of each supporting pixel. Optionally, the total number of the supporting ink droplets for each supporting pixel may be equal to total number of ink droplets for each pixel. The total number of the supporting ink droplets for each supporting pixel may include a number of supporting ink droplets of the main supporting material and a number of supporting ink droplets of the auxiliary material; while the total number of the ink droplets for each pixel may include a number of ink droplets of the main materials and a number of ink droplets of the auxiliary materials.

In one embodiment, when three ink droplets are ejected for each pixel, three supporting ink droplets are ejected for each supporting pixel. Among the three supporting ink droplets, there can be three, two or one supporting ink droplet(s) of the main supporting materials, and correspondingly, there can be zero, one or two supporting ink droplet(s) of the auxiliary material. The layer-support products may be only configured to provide support and to be peeled off easily. In addition, while providing support, the layer-support products should not affect the accuracy of the target 3D object. In this embodiment, two supporting ink droplets of the main supporting materials and one supporting ink droplet of the auxiliary materials may be ejected for each supporting pixel. The present disclosure does not limit arrangement manners for the supporting ink droplets of the main supporting materials and the supporting ink droplet of the auxiliary material. Optionally, when four ink droplets are ejected for each pixel, four supporting ink droplets are ejected for each supporting pixel. Among the four supporting ink droplets, there can be three supporting ink droplets of the main supporting materials, and one supporting ink droplets of the auxiliary material. Modifications based on above embodiments can also be achieved by those skilled in the art.

Further, below describes two exemplary printing manners for printing the mixed-material 3D object based on forming of the layer-print product in S2021 and forming of the layer-support product in S2022.

In a first exemplary printing manner, S2031 and S2041 are executed.

In S2031: A plurality of layer-print data is obtained by repeatedly layering the target object and obtaining the layer-print data of each layer in S201 and based on the plurality of layer-print data, a plurality of layer-print products is formed by repeatedly forming the layer-print product in S2021; synchronously, a plurality of layer-support products are formed by repeatedly forming the layer-support product in S2022. The layer-support product is configured to provide support for adjacent layer-print products.

In a second exemplary printing manner, S2032 and S2042 may be executed.

In S2032: A plurality of layer-print products are formed by repeatedly obtaining the layer-print data in S201 and repeatedly forming the layer-print product in S2021; and a plurality of layer-support products are formed by repeatedly obtaining the layer-print data in S201 and repeatedly forming the layer-support product in S2022. The layer-support product is configured to provide support for adjacent layer-print products.

Figure 11:
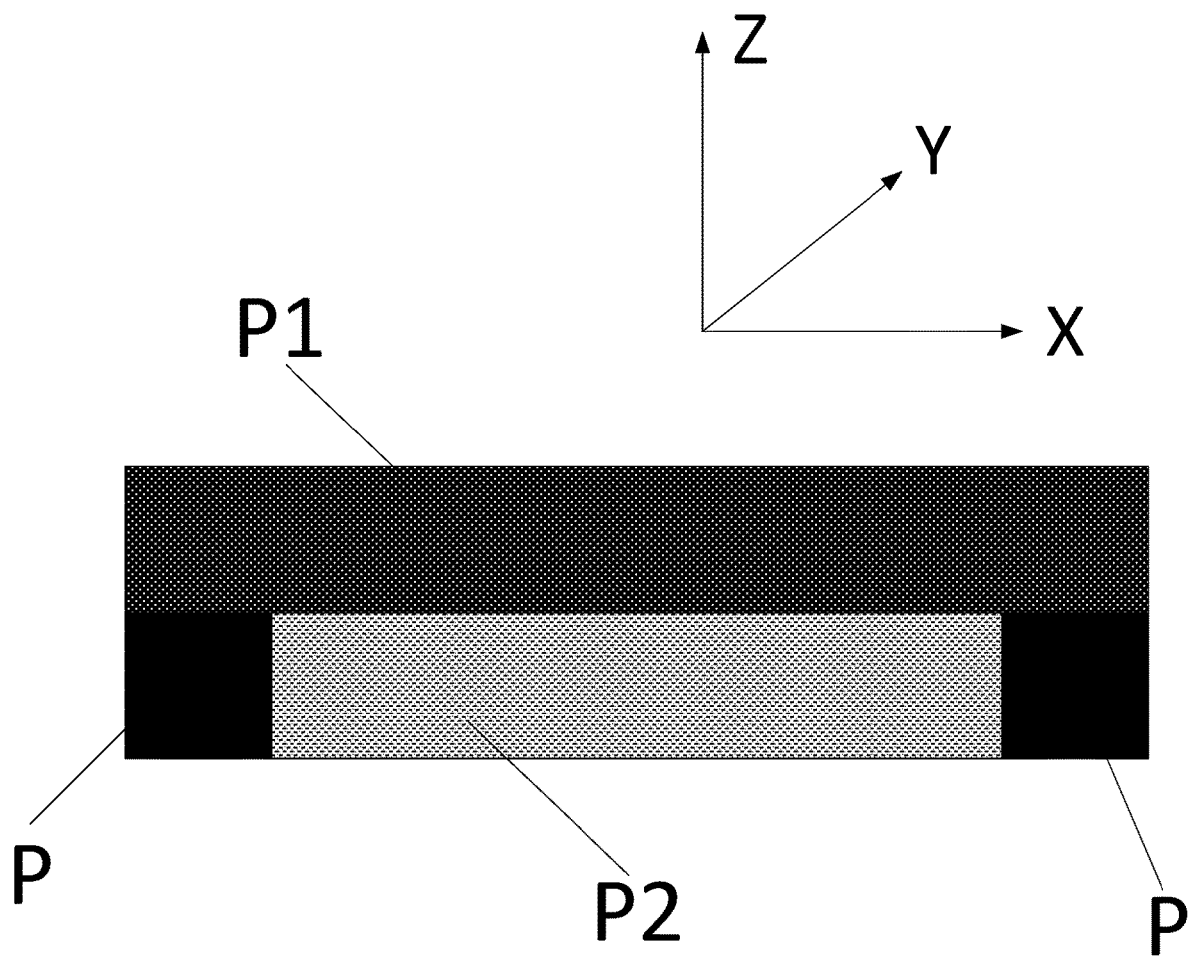
FIG. 11 shows location relationship between adjacent layer-print products P1 and P2 and a layer-support product P according to some embodiments of the present disclosure.

According to embodiments of the present disclosure, if adjacent layer-print products have different structures and shapes, a scenario may occur that a part of a latter layer may overhead a previous layer. In this case, it is necessary to print a supporting layer when the previous layer is printed, so as to provide support for the latter layer and prevent collapse. For example, FIG. 11 illustrates a location relationship between adjacent layer-print products P1 and P2 and the layer-support product P, to clearly illustrate formation of the layer-support product in S2031 and S2032.

Further, differences between the first exemplary printing manner and the second exemplary printing manner are as following. For the first exemplary printing manner, the target object is layered by a slicing software and the plurality of layer-print data corresponding to all layers is obtained, and then based on the plurality of layer-print data, the drive controller controls the print head to print layer by layer. For the second exemplary printing manner, the target object is layered by the slicing software to obtain one layer and layer-print data corresponding to the layer is obtained, and then according to the layer-print data corresponding to the layer, the layer is printed. During the printing process of the layer, the target object is layered by the slicing software to obtain a next layer and layer-print data corresponding to the next layer is obtained, and then based on the layer-print data corresponding to the next layer, the next layer is printed. In the second exemplary printing manner, the above operations are repeated till the printing of the target object is completed. Both two exemplary printing manner can achieve the objective of the present disclosure.

Further, S2041 or S2042 may be performed, based on the above S201-S2031 or S201-S2032, respectively.

In S2041 (or S2042): A mixed-material 3D object is formed by stacking one layer-print product on another. Descriptions of S2041 and S2042 are similar to descriptions of S103, and therefore are not repeated here.

Figure 12:
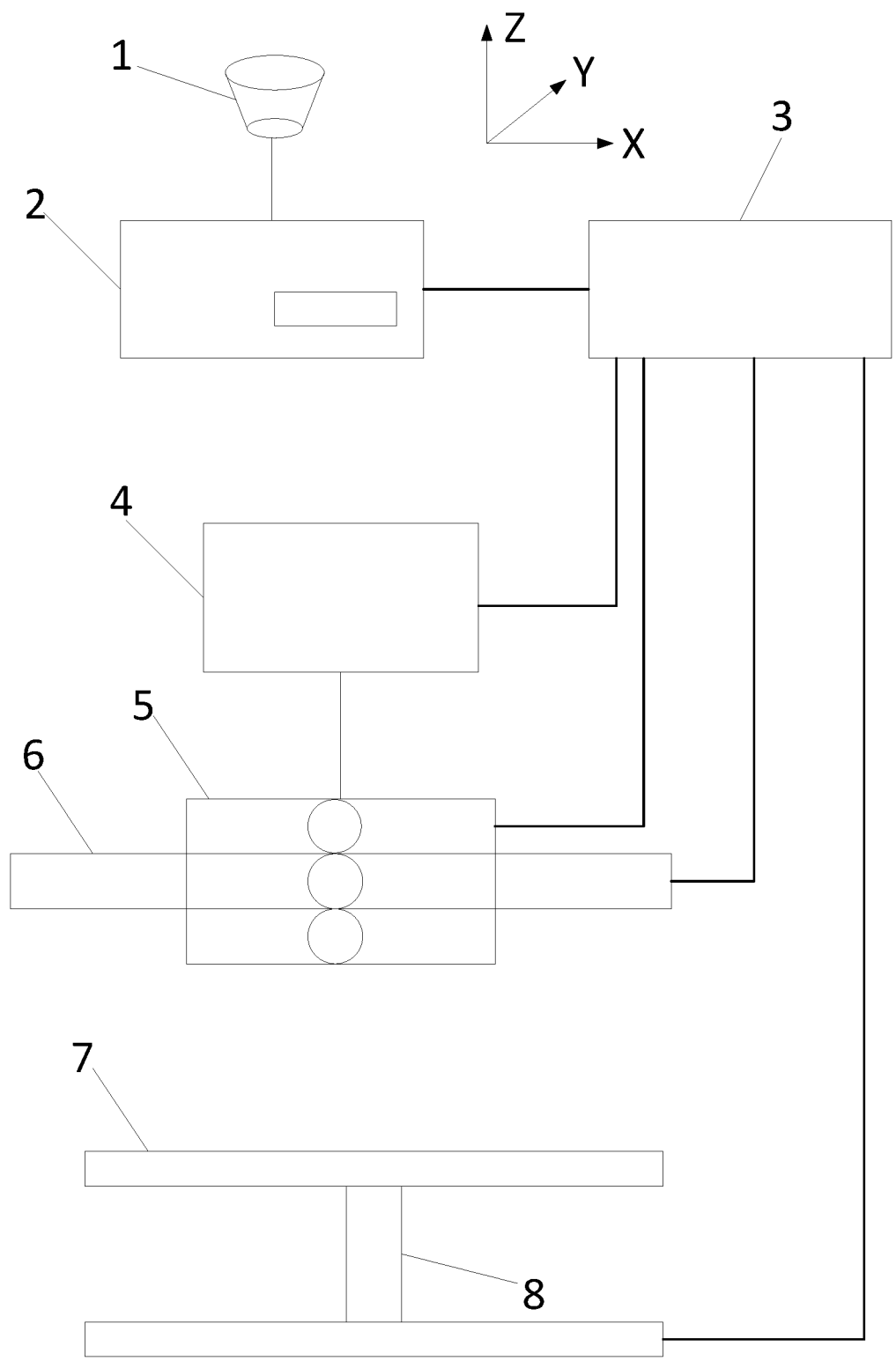
FIG. 12 and FIG. 13 schematically show an exemplary system for fabricating a mixed-material 3D object according to some embodiments of the present disclosure.
Figure 13:
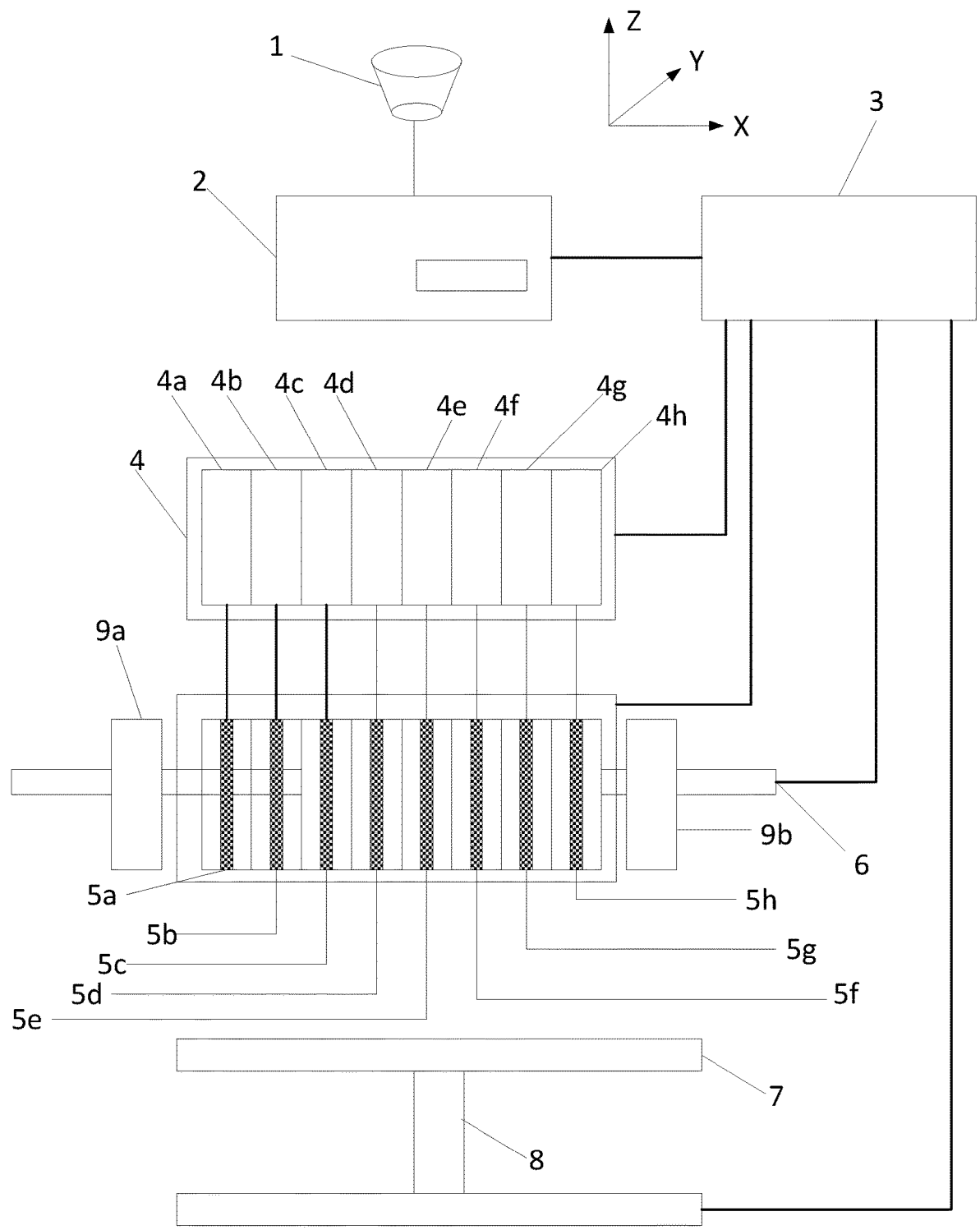

Another aspect of the present disclosure provides a system for fabricating a mixed-material 3D object. FIG. 12 and FIG. 13 schematically show an exemplary system for fabricating a mixed-material 3D object according to some embodiments of the present disclosure. The system for fabricating the mixed-material 3D object may include a processing terminal 2 configured to layer the target object 1 and obtain the layer-print data according to the structural information and nonstructural information of each layer. The target object may be a colored object or an object having materials with different properties. The nonstructural information of each layer may include color information or material-property information. The system may also include a drive controller 3, which may be configured to, according to the layer-print data, control a print head 5 to print.

Further, the functions of the processing terminal 2 and the drive controller 3 may be implemented by a hardware, a software executed by a processor, or a combination of both. Optionally, if a software module is used to implement the functions of the processing terminal 2 and the drive controller 3, a program may be loaded into the processor in advance or the software may be installed in a preset programed system. If the hardware is used to implement the functions of the processing terminal 2 and the drive controller 3, a field-programmable gate array (FPGA) may be used to realize immobile implementation of the corresponding functions.

Further, the software module may be stored in a RAM memory, a flash memory, a ROM memory, an EPROM memory, a hard disk, or any other form of storage medium known in the art. By coupling the storage medium to a processor, the processor is enabled to read information from the storage medium and write information to the storage medium. Optionally, the storage medium may be an integral part of the processor, or both the processor and the storage medium may be located on an application specific integrated circuit (ASIC).

Further, the hardware may be a general-purpose processor, a digital signal processor (DSP), an ASIC, a FPGA or other programmable logic device, a discrete gate or transistor logic device, and a discrete hardware component or a combination of the above hardware, which can implement the corresponding functions. Optionally, the corresponding functions may also be implemented by a combination of computing devices, for example, a combination of a DSP and a microprocessor, a combination of a plurality of microprocessors, and a combination of one or more microprocessors communicatively connected with a DSP, etc.

As shown in FIG. 13, the system for fabricating the mixed-material 3D object based on the target object 1 may include the processing terminal 2, the drive controller 3, multiple containers 4 for printing materials, the print head 5 with a plurality of printing channels 5a-5h, a guide rail 6, a supporting platform 7, a lift platform 8, and LEDs 9a and 9b. The containers for materials may include containers 4g and 4h for main supporting materials, containers 4a, 4b and 4c for main materials, and containers 4d, 4e and 4f for auxiliary materials. For example, the main materials may include the C material, the M material and the Y material, and the auxiliary material may be the W material; three ink droplets may be ejected for each pixel, and only one ink droplet of the same type of the main materials may be ejected for each pixel; and three supporting ink droplets may be ejected for each supporting pixel, and among the three supporting ink droplets, there are two supporting ink droplets of the main supporting materials, and one supporting ink droplet of the auxiliary material. The present disclosure does not limit the number of containers for a same type of the printing materials. For example, one container can provide ink for a plurality of printing channels for a same type of the printing materials. Each container 4 of the printing materials and each printing channel may be used for any of the printing material including the main materials, the auxiliary materials, the main supporting materials, etc.) As shown in FIG. 13, there are two contains 4g and 4h for the main supporting materials, and three contains 4d, 4e, and 4f for the auxiliary materials, and each of the contains 4a, 4b, and 4c corresponds to each of the main materials. The contains 4g and 4h for the main supporting materials are configured to accommodate the main supporting material S1 and provide ink for the printing channels 5g and 5h. The container 4a for the main materials is configured to accommodate the C material and provide ink for the printing channel 5a. The container 4b for the main materials is configured to accommodate the M material and provide ink for the printing channel 5b. The container 4c for the main materials is configured to accommodate the Y material and provide ink for the printing channel 5c. The containers 4d, 4e and 4f are configured to accommodate the W material. The processing terminal 2 can obtain the layer-print data of the target object 1, for example in S201, and the layer-print data may include the layer structural data and the layer nonstructural data. The processing terminal 2 can send the layer-print data to the drive controller 3, and by implementing a method, for example shown in FIG. 10, the drive controller can complete printing the mixed-material 3D object. Detail descriptions of the implementation manner may refer to descriptions of FIG. 10.

Optionally, the main materials may include the C material, the M material, and the Y material, and the auxiliary materials may include the W material; four ink droplets are ejected for each pixel; only one ink droplet of the same type of the main materials may be ejected for each pixel. In addition, four supporting ink droplets are ejected for each supporting pixel, and among the four supporting ink droplets, there can be three supporting ink droplets of the main supporting materials, and one supporting ink droplet of the auxiliary material. Correspondingly, based on the system shown in FIG. 13, the print head of the system may further include one more printing channel for the main materials and one more printing channel for the auxiliary materials.

Optionally, the system may have the following configuration. The system may include a container for a property material A, a container for a property material B, a container for an auxiliary material F, and a container for a main supporting material. Correspondingly, the printing channels may include a printing channel for the property material A, a printing channel for the property material B, a printing channel for the auxiliary material F, and a printing channel for the main supporting materials. Arrangement manners of the printing channels are not limited by the present disclosure.

Further, the drive controller 3 may control the print head 5 to eject ink droplets on a pixel in a following manner. The drive controller 3 can control an ignition time of an ejection orifice of each printing channel of the print head, such that a preset number of ink droplets are ejected on one pixel. For example, if three ink droplets are ejected to a cyan pixel, the drive controller 3 may control the container for the C material to provide ink to the printing channel of the print head for the C material; the drive controller 3 may also control the printing channel for the C material to eject one ink droplet of the C material through the ejection orifice on a location corresponding to the cyan pixel. The drive controller 3 may also control the two containers for the W material to respectively provide ink to the printing channels for the W material and control the printing channels for the W material to eject one ink droplet of the W material through the ejection orifice on the location corresponding to the cyan pixel. Similar manners can be used for forming other pixels, which are not repeated here.

As shown in FIG. 13, two LEDs 9a and 9b may be mounted on both sides of the print head 5, and the print head 5 and the LEDs 9a and 9b may all be mounted on the guide rail 6. When the print head 5 is performing layer-by-layer printing, the LEDs 9a and 9b can work simultaneously or alternately. The LEDs 9a and 9b are configured to cure materials of each layer to form each layer of the 3D object. After printing of each layer-print product is completed or after printing of a plurality of layer-print products is completed, the lifting platform 8 may descend a certain height, such that the print head 5 can continue printing remaining layer-print products. The mixed-material 3D object can be formed on the supporting platform 7.

Above describes some embodiments of the present disclosure. The above embodiments are not to limit the present disclosure. Various modifications and changes may be made by those skilled in the art without departing from the scope of the present disclosure.

What is claimed is:

1. A method for fabricating a mixed-material 3D object, comprising:

layering a target object;

obtaining layer-print data based on structural information and nonstructural information of each layer of the target object, wherein the layer-print data includes layer structural data and layer nonstructural data;

forming, based on the layer-print data of the target object, a layer-print product by one-by-one printing a plurality of pixels, using $N_0$ main color materials for the target object, wherein:

at least one of the plurality of pixels is printed by $N_1$ the main color materials and $N_2$ auxiliary materials, $N_1 \leq N_0$, and $N_2 \geq 1$;

each of the plurality of pixels is formed by ejecting a plurality of ink droplets;

each ink droplet includes only one of the $N_1$ main color materials or the $N_2$ auxiliary materials, wherein the main color material is different from the auxiliary material;

a number of the plurality of ink droplets ejected for each pixel equals each other;

at most one ink droplet of a same type of the main materials is ejected for each pixel;

the auxiliary materials include at least one of a white material and a transparent material; and the $N_0$ main color materials include at least two of C(cyan) material, M(magenta) material, Y(yellow) material, BK (Black) material; and forming a plurality of the layer-print products by repeatedly forming the layer-print product; and forming the mixed-material 3D object by stacking one of the layer-print products on another.

2. The method according to claim 1, wherein forming each of the plurality of pixels includes one or more of:
ejecting at least one ink droplet of the main color materials, and
ejecting at least one ink droplet of the auxiliary materials.

3. The method according to claim 2, wherein:
at least one ink droplet of the main color materials is ejected for each pixel.

4. The method according to claim 2, wherein:
at least one ink droplet of the auxiliary materials is ejected for each pixel.

5. The method according to claim 1, wherein the non-structural data includes at least one of color data or material-property data.

6. The method according to claim 1, wherein forming the plurality of the layer-print products includes:
forming, according to the layer structural data, a layer-support product by one-by-one printing supporting pixels using supporting materials, wherein the layer-support product is configured to provide a support for adjacent layer-print products.

7. The method according to claim 6, wherein:
the supporting materials include main supporting materials and the auxiliary materials;
each supporting pixel is formed by ejecting a plurality of supporting ink droplets; and
each of the plurality of supporting ink droplets is ejected using one of: one of the main supporting material and one of the auxiliary material.

8. The method according to claim 7, wherein each supporting pixel is printed using at least one of the main supporting materials and at least one of the auxiliary materials.

9. The method according to claim 8, wherein a number of the ink droplets for each pixel is same as a number of supporting ink droplets for each supporting pixel.

10. The method according to claim 1, wherein the plurality of ink droplets for a single pixel are distributed on a same x-y plane.

11. The method according to claim 1, wherein:
a total number of ink droplets of each of the plurality of pixels, which equals a sum of a number of ink droplets of main color materials of each of the plurality of pixels and a number of ink droplets of the auxiliary materials of each of the plurality of pixels, equals to each other.

* * * * *